Patented Oct. 16, 1923.

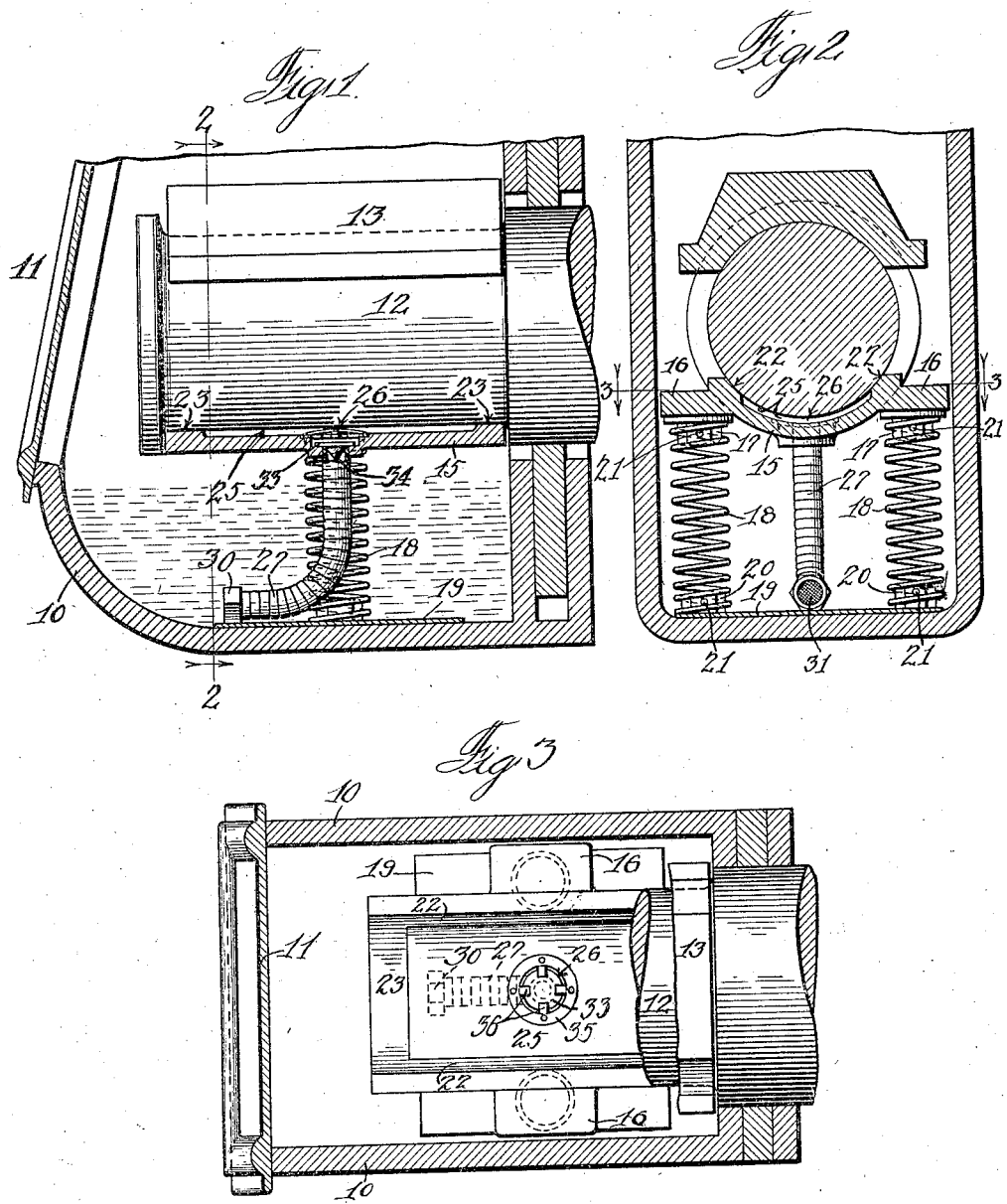

1,470,739

UNITED STATES PATENT OFFICE.

THOMAS J. HOLMES, OF CHICAGO, ILLINOIS.

JOURNAL LUBRICATOR.

Application filed August 30, 1921. Serial No. 496,895.

*To all whom it may concern:*

Be it known that I, THOMAS J. HOLMES, a citizen of the United States, and a resident of Chicago, Cook County, Illinois, have invented certain new and useful Improvements Relating to Journal Lubricators, of which the following is a specification.

The present improvements have been made particularly in view of the car journal lubricating art and their principal object is the provision of means for effectively maintaining the desired quantity of lubricant on the journal. An important object is to provide means whereby a quantity of substantially thick and heavy grease may be used instead of the fluid oils ordinarily employed, such grease being far more advantageous than the oil in such heavy work. It is also an object to attain these results by simple means, and by means which provide a high factor of safety against neglect.

In the accompanying drawings, which form a part of this specification, Figure 1 is a fragmentary medial vertical sectional view of a car journal unit, the journal and its bearing being in full side view and my improved lubricating device being in medial vertical longitudinal section as it appears in operative position; Fig. 2 is a cross sectional view on the line 2—2 of Fig. 1; and Fig. 3 is a sectional top view with the journal and its bearing partly broken away.

The journal box having a door 11, the journal 12 and its bearing block or member 13 are shown as of the usual construction.

Normally beneath the journal 12 and extending substantially from end to end thereof is the friction piece 15, which is of metal and suitably of cast brass or bronze. It has laterally extended ears 16 provided with integral bosses 17 adapted to accommodate the coiled springs 18 respectively, which springs are held in position at their lower ends upon the base plate 19 by the bosses 20 thereon, pins 21 projecting from the bosses maintaining the springs upon the friction piece and the base plate, the friction piece being thus yieldingly held in frictional contact with the journal.

The friction piece 15 has an annular bearing surface 22—23, the lateral surfaces 22 extending along the side edges of the friction piece while the cross surfaces 23 extend along the end edges thereof. This annular surface 22—23 conforms to the shape of the journal and makes a close frictional fit therewith.

The friction piece 15 has a depression 25 in its upper surface which depression is defined by the friction surfaces 22—23 and forms a substantially shallow pocket adapted to contain a quantity of lubricant. The friction piece is provided with a hole at 26 which opens into the depression 25, and leading from this hole 26 and rigidly secured to the friction piece is a flexible pipe 27 which extends downward therefrom and bends forward and is provided at its free end with an outwardly extending ring 30, shown as a hexagonal nut, which maintains the open end of the pipe 27 somewhat above the bottom of the journal box and prevents the bottom layer of the lubricant, likely to contain dirt, from entering the pipe. A screen 31 covers the pipe opening and prevents objectionable foreign substances from entering the pipe.

According to these improvements the journal box 10 may be supplied with a considerable quantity of rather heavy grease or grease and oil mixed, some of the grease preferably being applied to the pocket 25 when the device is put into operation for the first time. The friction piece may simply be pressed downward for this purpose. The rotation of the journal 12 tends to cause a vacuum in the pocket 25 and in the pipe 27 with the result that the lubricant is drawn through the pipe 27 into the pocket 25 and thus into contact with the journal. The presence of the annular surfaces 22 and 23 not only induces this suction action but these surfaces act to limit the amount of lubricant applied to the journal, with the result that only a thin filament of the lubricant coats the journal as it turns toward the bearing member as 13.

Since the friction surfaces 22 and 23 fit the journal accurately (a little wear making this fit substantially perfect) the lubricant in the pocket 25 and pipe 27 is ordinarily held there by external air pressure even when the car remains idle for a long time. The seal between the surfaces 22—23 and the journal may be broken, however, as at times of inspection, or in the case of foreign matter which might temporarily separate the parts, and to preserve the supply of lubricant in such case I provide the automatic valve 33 comprising a light-weight disc having a conical projection 34 adapted to center it, the plate being adapted to rise as the lubricant is drawn upward for use and to seat itself and close the passageway when the suction is discontinued. A retaining plate 35 having projections 36 holds the valve plate 33 in an enlargement of the hole 26 as shown.

Should a supply of grease be wanting at a particular time and place a quantity of the usual oil may be supplied to the device for use in the manner described, but even if the supply of grease in the bottom of the box were permitted to remain exhausted for a very considerable period the amount of grease in the pipe 27 and in the pocket 25 would keep the journal lubricated as usual, since a relatively small quantity of the heavy grease is effective for an amazingly large mileage of the car.

When the device is used in connection with the ordinary journal box it will be installed as a permanent part of the structure, but with some forms of box it may be positioned or removed at any time.

I contemplate as being within these improvements various departures from what is specifically herein illustrated and described, as indicated in the appended claims.

I claim:

1. The combination of a car journal, a bearing on the upper side of the journal, a journal box substantially surrounding the journal and adapted to contain a material quantity of lubricant below the journal, a friction piece having a continuous friction surface substantially conforming to the bearing surface of the journal to be lubricated and extending substantially from end to end of the friction piece along the side edges thereof and from side to side thereof along end edges thereof, said friction piece having a depressed portion surrounded by said annular friction surface, the depressed portion forming a pocket adapted to contain a quantity of lubricant, there being an opening in the depressed portion of said friction piece, the journal box forming a receptacle for lubricant below said friction piece, flexible pipe means extending from the opening in said friction piece into the lower portion of the journal box, and means for yieldingly holding the friction piece in engagement with the journal.

2. The combination of claim 1 hereof including also an automatic valve comprising a light-weight plate and a seat on which the plate rests and from which it may rise for controlling the flow of lubricant through said pipe means in one direction, said valve being adapted to open when the lubricant flows toward the friction piece and to close when it tends to flow in the opposite direction.

THOMAS J. HOLMES.